J. W. Austin,
Treating Cane Juice.
No. 109,571. Patented Nov. 29, 1870.

Witnesses:
Gustave Dieterich
L. S. Babee

Inventor:
John W. Austin
per Munn & Co.
Attorneys.

United States Patent Office.

JOHN W. AUSTIN, OF PLAQUEMINE, LOUISIANA.

Letters Patent No. 109,571, dated November 29, 1870.

IMPROVEMENT IN APPARATUS FOR TREATING CANE-JUICE WITH SULPHUROUS-ACID GAS.

The Schedule referred to in these Letters Patent and making part of the same.

*To all whom it may concern:*

Be it known that I, JOHN W. AUSTIN, of Plaquemine, in the parish of Iberville and State of Louisiana, have invented a new and useful Improvement in Apparatus for Clarifying Cane-juice with Sulphurous-Acid Gas; and I do hereby declare that the following is a full, clear, and exact description thereof, which will enable others skilled in the art to make and use the same, reference being had to the accompanying drawing forming part of this specification, in which—

Similar letters of reference indicate corresponding parts.

My invention has for its object to furnish an improved apparatus for bleaching, clarifying, and otherwise affecting cane-juice and other liquids by the application of sulphurous-acid gas or other gases, which shall be simple in construction and effective in operation; and It consists in the construction and combination of various parts of the apparatus, as hereinafter more fully described.

A is a tank of any desired or convenient size, which I prefer to make of wooden staves with iron hoops.

The tank A is supported at a convenient height by short posts B.

Figure 1:
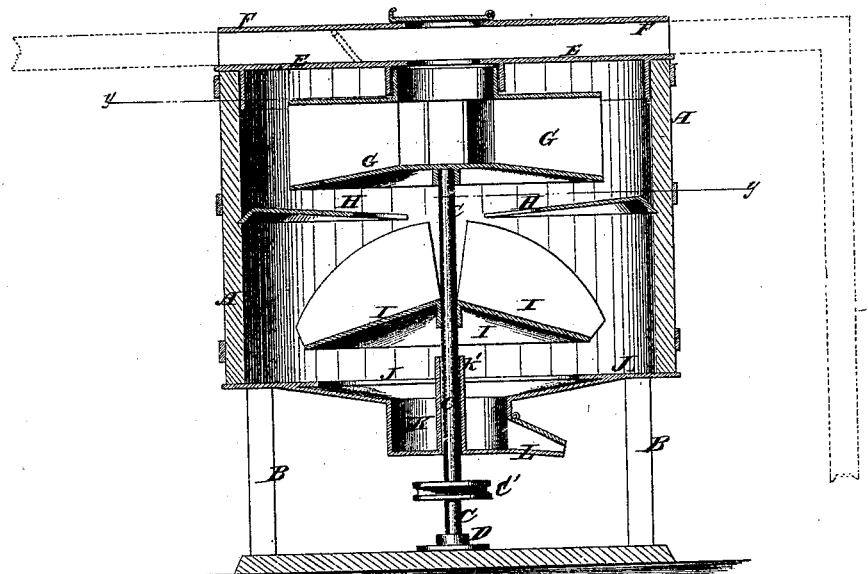
Figure 1 is a vertical section of my improved apparatus, taken through the line *x x*, fig. 2.

C is a spindle passing up through the center of the tank A, and the lower end of which revolves in a step, D, as shown in fig. 1.

The spindle C has a pulley, *c'*, attached to it, to receive the belt by which the said spindle is revolved, and which may be driven by any convenient power.

E is the top or cover of the tank A, which is made with an opening in its center, through which the cane-juice and sulphurous-acid gas are introduced into the tank A.

To the cover E is secured a close trough or pipe, F, having a hole in its bottom corresponding with the hole through the cover E. One part or end of the trough F receives the cane-juice and conducts it into the tank A. This part of the trough F should be provided with a hinged or swinging gate, as indicated in dotted lines in fig. 1, which may be opened by the inflowing juice, and may prevent the escape of the gas.

The other part or end of the trough F receives the gas from the retort or furnace, and conducts it into the tank A through the same opening with the cane-juice. In the top of the trough F, directly over the opening leading into the tank A, is formed an opening, closed with a door, for convenience in cleaning out the said tank A.

G is a drum, securely attached to the upper end of the spindle C, so as to be carried around by and with the said spindle in its revolution. The bottom of the drum G is made close, and with its outer parts slightly inclined downward. The top of the drum G has an opening in its center directly beneath and corresponding with the opening in the top E of the tank A.

The top or cover E of the tank A, around its opening is provided with a downwardly-projecting flange, which overlaps an upwardly-projecting flange attached to the top of the drum G around its opening, to guide the juice and gas into the said drum G.

Figure 2:
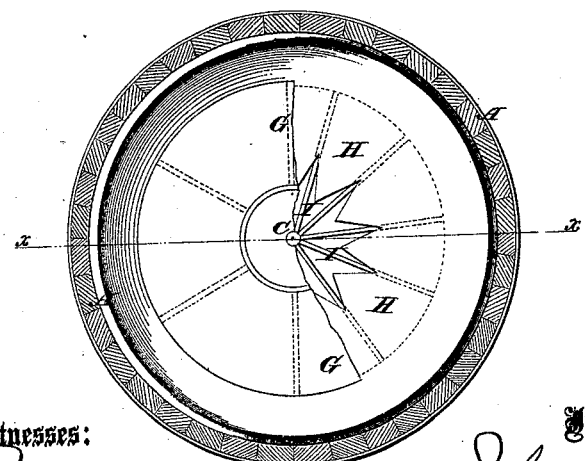
Figure 2 is a detail horizontal section of the same, taken through the line *y y*, fig. 1.

The top and bottom of the drum G are connected by radial partitions extending from the outer edge of the said drum to the hole in the center of its top, as shown in fig. 1, and in dotted lines in fig. 2.

By this construction, as the juice and gas flow into the rapidly-revolving drum G, they are thrown out around the sides of the tank A by centrifugal force, and are thoroughly intermingled.

The mingled juice and gas from the drum G falls upon the partition H, that divides the tank A into two compartments, and the middle part of which inclines slightly downward, and has a hole formed through its center, through which the spindle C passes, and through which the mingled juice and gas flows to the drum I.

The drum I is securely attached to the spindle C, so as to be carried around by and with the said spindle C in its revolution. The drum I is made in the form of a conical or hemispherical plate, having radial flanges or ribs attached to its upper or convex side, as shown in figs. 1 and 2, so that as the mingled juice and gas flows upon it from the partition H, they may be again thrown outward by centrifugal force and more thoroughly mixed.

The mingled juice and gas from the drum I falls upon the bottom J of the tank A, the middle part of which is inclined downward or concaved, and has a hole or opening formed in its center, through which the spindle C passes, and through which the mingled juice and gas flows into the basin K, placed beneath and secured to the bottom J, and from which the juice and escaping gas flows out through the pipe or trough L, which should be provided with a hinged or pivoted gate opened by the outflowing liquid.

The basin K is made with an open pipe, *k'*, in its center, through which the spindle C passes, and which prevents any of the juice from escaping around said spindle.

Having thus described my invention,

I claim as new and desire to secure by Letters Patent—

1. The drum G, constructed as described, in combination with the spindle C and tank A, having openings in the centers of its top E and partition or bottom H, for the ingress and egress of the juice and gas, substantially as herein shown and described, and for the purpose set forth.

2. The drum I, constructed as described, in combination with the spindle C, drum G, and tank A, having openings in the centers of its top E, partition H, and bottom J, for the passage of the juice and gas, substantially as herein shown and described, and for the purpose set forth.

3. The basin K, constructed with a central open pipe, $k'$, and discharge trough or spout L, in combination with the spindle C, drums G and I, and tank A, having openings in the centers of its top E, partition H, and bottom J, for the passage of the juice and gas, substantially as herein shown and described, and for the purpose set forth.

JOHN W. AUSTIN.

Witnesses:
 JNO. M. GREEN,
 Mrs. M. A. BROWN.